(12) United States Patent
Gioia et al.

(10) Patent No.: US 7,409,773 B1
(45) Date of Patent: Aug. 12, 2008

(54) TILE ANGLE MEASUREMENT DEVICE

(76) Inventors: Constantine Michael Gioia, 2791 Fenimore Dr., Sumter, SC (US) 29150; Valeska Nunziata Gioia, 2791 Fenimore Dr., Sumter, SC (US) 29150

( * ) Notice: Subject to any disclaimer, the term of this patent is extended or adjusted under 35 U.S.C. 154(b) by 0 days.

(21) Appl. No.: 11/582,537

(22) Filed: Oct. 16, 2006

(51) Int. Cl.
  *G01B 5/24* (2006.01)
  *B43L 7/10* (2006.01)
(52) U.S. Cl. ........................................ 33/527
(58) Field of Classification Search ................ 33/526, 33/527
  See application file for complete search history.

(56) References Cited

U.S. PATENT DOCUMENTS

| | | | |
|---|---|---|---|
| 71,595 A | 12/1867 | Evans | |
| 1,142,368 A | 9/1915 | Row | |
| 2,144,697 A * | 1/1939 | Zangrando | 33/527 |
| 2,580,263 A | 12/1951 | Wooten | |
| 3,718,980 A * | 3/1973 | Poulos | 33/526 |
| 3,852,889 A | 12/1974 | Atkins | |
| 4,267,638 A | 5/1981 | Heinz | |
| 5,188,013 A * | 2/1993 | Cardinale | 33/527 |
| 5,617,642 A * | 4/1997 | Marios | 33/526 |
| 5,894,774 A | 4/1999 | Trimble | |
| 6,195,904 B1 * | 3/2001 | Greer | 33/527 |
| 6,260,283 B1 | 7/2001 | Abernathy et al. | |
| 6,467,179 B1 | 10/2002 | Wolf | |
| 6,729,035 B1 * | 5/2004 | Carrillo | 33/526 |

FOREIGN PATENT DOCUMENTS

| | | |
|---|---|---|
| DE | 3418260 | 11/1985 |
| GB | 191418817 | 8/1915 |
| GB | 74927 | 1/1956 |
| GB | 189902578 | 7/1999 |

\* cited by examiner

*Primary Examiner*—Christopher W Fulton
(74) *Attorney, Agent, or Firm*—Michael I Kroll (57) ABSTRACT

A device for facilitating the correct measurement and placement of tiles having a transparent top plate for viewing indicia markings on bottom sliding plate, also having a channel for the setting of a rule that is angularly and spatially adjustable from the thin metal abutment edge through the loosening and tightening of a wing nut and washer attached to the ruler through said channel. Additionally the rule of the present invention is equipped with a stop which ends 1¼" from its side edges for the utilization of the present invention as a guide for correct placement of tile.

6 Claims, 11 Drawing Sheets

TILE ANGLE MEASUREMENT DEVICE

BACKGROUND OF THE INVENTION

1. Field of the Invention

The present invention relates generally to measuring devices and, more specifically, to a device for facilitating the correct measurement and placement of tiles. The present invention is a top face plate composed of a translucent and planar sheet having a center channel whereby a ruler is attached therethrough that may be displaced up and down the channel at assorted angles and the ruler can be releasably fixed by applying torque to a wing nut.

The ruler of the present invention, also translucent, additionally has a stop extending from the ruler that is utilized with a second thin metal abutment edge located lining the bottom of the top face plate that when used in conjunction allows for the user to place tile accurately and at angles by using said components as a place guide.

Additionally the ruler of the present invention can be turned to a plurality of angles and has a plurality of ruled markings and indicia representative of grout lines utilized commonly by the user for correct tile placement 2. Description of the Prior Art There are other measurement devices designed for placing tile. Typical of these is U.S. Pat. No. 71,595 issued to Evans on Dec. 3, 1867.

Another patent was issued to Row on Jun. 8, 1915 as U.S. Pat. No. 1,142,368. Yet another U.S. Pat. No. 2,580,263 was issued to Wooten on Dec. 25, 1951 and still yet another was issued on Dec. 10, 1974 to Atkins as U.S. Pat. No. 3,852,889.

Another patent was issued to Heinz on May 19, 1981 as U.S. Pat. No. 4,267,638. Yet another U.S. Pat. No. 5,894,774 was issued to Trimble on Apr. 20, 1999. Another was issued to Abernathy, et al. on Jul. 17, 2001 as U.S. Pat. No. 6,260,283 and still yet another was issued on Oct. 22, 2002 to Wolf as U.S. Pat. No. 6,467,179.

Another patent was issued to Strahan on Aug. 12, 1915 as U.K. Patent No. GB191418817. Yet another U.K. Patent No. GB742927 was issued to Trimingham, et al. on Jan. 4, 1956. Another was issued to Cairns on Nov. 21, 1985 as German Patent No. DE3418260 and still yet another was issued on Jul. 7, 1899 to McMullen as U.K. Patent No. GB189902578.

U.S. Pat. No. 71,595

Inventor: Thomas Evans

Issued: Dec. 3, 1867

Disclosed is a square, a, graduated on the edges, combined with a sliding bar, g, arranged to move freely along one arm of the square a, and stand at right angles therewith. A straight-edge, b, is clamped to the bar g by a thumb-nut or screw, f, and held in contact with the other arm of the square a, by the piece h, fastened to the straight-edge b, and pinching the arm k of the square a.

U.S. Pat. No. 1,142,368

Inventor: Charles G. Row

Issued: Jun. 8, 1915

A drafting instrument comprising a stationary blade adapted to be secured to a drafting board or pad; a second blade slidably mounted upon the first mentioned blade and arranged transversely, thereto: a third blade slidably mounted upon the second mentioned blade and arranged to lie parallel with the first mentioned blade; a runner slidably mounted upon the third mentioned blade; means adapted to prevent the movement of the runner on the third mentioned blade; a pivotal member secured to the runner; and a fourth blade having a series of apertures aligned at regular intervals therein and slidably secured to the pivotal member.

U.S. Pat. No. 2,580,263

Inventor: Lewis A. Wooten

Issued: Dec. 25, 1951

A brick scribing tool comprising a rectangular shape frame having side and end bars and with a slot extended through the side ba, one of the end bars and to a point midway of the length if the other end bar, pins having heads on one end and threads on the other slidably mounted in the slot of the frame, a bar having an elongated slot therein slidably mounted on the pins, and thumb nuts threaded on the pins for securing the bar having the elongated slot therein in adjusted positions.

U.S. Pat. No. 3,852,889

Inventor: Thomas W. Atkins

Issued: Dec. 10, 1974

A device for making a perspective drawing. The device is constructed of a material through which a scene to be drawn can be viewed. This device includes a planer base having a vertically extending framing edge which is provided with a means for orientating the planer base member in a vertical plane, such as a pair odd spaced apart lines on transparent member and disposed in a plane perpendicular to the plane of said base member, and for orientating the framing edge to extend vertically, such as a plumb line or level bubble so as to determine the horizon. A pair of orthogonal scales is provided on the base for indicating the relative positions of the scene with respect to the determined horizon. Means are also provided that have a straight edge portion which is rotatably mounted on the base and which extends across the base so as to be rotatable in the vertical plane to, thereby, be alignable with a line in the scene U.S. Pat. No. 4,267,638

Inventor: Richard A. Heinz

Issued: May 19, 1981

A protected pivot adjustable scaled compasses including a slotted body marked with multiple scales. A spring loaded transparent push button with pivot point retractable within the body support. A transparent movable slide arrangement with locking mechanism supported by and positioned over the scaled body. The slide configured with multiple sized holes intersecting alignment marks for use in conjunction with the scales to accurately set and circumscribe arcs or circles using a variety of readily available marking instruments. A washer used in conjunction with the slide locking screw to raise the slide and body during ink application and lower the slide and body when a pencil or scribe is used.

U.S. Pat. No. 5,894,774

Inventor: Perry C. Trimble

Issued: Apr. 20, 1999

A guard for use with rotary cutters in the cloth cutting and related arts. The design includes a wide, clear plate for placement over cloth to be cut and an upturned edge portion to allow application of a rotary cutter device. The method steps of the invention use the apparatus in combination with a guide ruler to enable the easy and safe use of conventional rulers in combination with rotary cutting devices.

U.S. Pat. No. 6,260,283

Inventor: Paul B. Abernathy, et al.

Issued: Jul. 17, 2001

A multi-functional carpentry tool includes a base plate having opposed front and back major surfaces, and at least one side edge bearing surface perpendicular to the front and back surfaces. A pivot ruler is secured to the base plate and extends across and parallel to the front major surface and outwardly from the base plate. The pivot ruler includes an elongated marking member having opposing straight side edges. A longitudinal slot is formed in the marking member parallel to and between the opposed side edges of the marking member. A pivot attachment device is received through the slot of the marking member and into the base plate for pivotally attaching the marking member to the base plate. The marking member is slidable across the front major surface of the base plate a distance equal to the length of the slot.

U.S. Pat. No. 6,467,179

Inventor: Sigrid Hammer Wolf

Issued: Oct. 22, 2002

This Measuring and Drafting Tool relates to a new and useful type of measuring and drafting tool that may be used to accomplish a plurality of functions using a singular tool. These functions include application as a ruler, straight edge, T-square, square or squaring tool, center gage, an edge transcribing and duplicating tool, and as a tool for striking circles and circle arcs. Some modified embodiments of the Measuring and Drafting Tool are also capable of angle measurement and protractor functions, and may also include one or more bubble levels incorporated into the ruler segments, thereby allowing the user to check if a horizontal surface is level.

U.K. Patent Number GB191418817

Inventor: James Strahan

Issued: Aug. 12, 1915

A tee-square or ruler is retained parallel to its original direction when moved, and supported in position on a vertical or inclined drawing-board or blackboard, by means of spring-controlled balls, rollers, plungers, etc. carried by the head of the tee-square, or by a separate carrier, and bearing against a guide-slip; a scaled arm, pivoted on a slide traveling on the blade of the tee-square or on the ruler and having an index reading against a protractor, may also be provided. As shown in FIGS. 1 and 2, balls F', F$<2>$ are mounted in a carrier C secured to the head A of a tee-square, and are pressed by springs 4$<1>$, 4$<2>$, the pressure of which is adjustable by screws S$<1>$, S$<2>$, against a guide-slip G secured beneath the board. The carrier C is secured to the head A by cross-pieces B$<1>$, B$<2>$ and by rabbeted blocks Z, which also bear against the guide-slip and hold the head A away from the edge of the board. Additional spring-pressed balls such as F$<3>$ may be provided, and the balls are all placed so that the pressure exerted by them causes the blade to maintain contact with the board. A scaled arm O, which may be detachably secured to a back-plate on a spindle T, is held in any position by friction at the pivot, the friction being variable by means of a nut P, and has an index finger h provided with a notch or the like to engage projections i at the points most frequently used on the protractor M. The protractor M is rotatably carried on a slide M$<1>$ and held as desired by pinching-screws x, the slide M' having grooved bars engaging a guide-bar K carried on the blade I by distance-washers L. The protractor may be fixed and project over the arm 0, the arm being provided with a centrally-placed index mark by which its position may be read. As shown in FIG. 3, a ruler is provided with a carrier containing balls or the like 1$<1>$, 1$<2>$ and with a block carrying a spring-mounted ball F, the balls engaging a guide-slip G with a pressure which may be adjusted by a screw S. Modifications are described in which a double-headed tee-square has spring-pressed balls or the like bearing against two guide-slips on opposite edges or on the face of the board, and in which a single-headed tee-square has a carrier for spring-pressed balls or the like secured to the head and bearing against a guide-slip on the face of the board.

U.K. Patent Number GB742927

Inventor: Austin Loch Trimingham

Issued: Jan. 4, 1956

In a draughting-machine including a frame 1 for supporting a drawing board 5, a flexible metallic tape 25 having a straight edge and mounted on the frame to extend across the board and a member 21 having a straight edge and secured to the tape with the straight edges at a fixed angle to one another, the tape 25 is movable across the board in a direction at right-angles to its straight edge and is also movable longitudinally so that member 21 is movable across the board. Preferably the board 5 and the frame 1 are relatively rotatable. As shown, a circular baseboard 4 supporting the board 5 is mounted on a pivot 3 at the intersection of cross-braces 2. An angular scale and locking means may be provided. Baseboard 4, or alternatively frame 1 if the frame is rotatable about the baseboard, may have rollers moving on a circular track. A member 11 with opposite parallel chamfered edges 15 has pinions 12 engaging racks 13, 14 on opposite sides of frame 1 so as to move parallel to itself. A slide 17 with finger-pieces 18, slidable in a groove 16 in member 11, carries a mounting bar 19 with dove-tailed extensions on both sides of member 11 to receive the member 21. The tape 25 extends along a chamfered edge of member 11 on the same side thereof as member 21. It extends under fingers 25a, and its ends are coiled within housings 26, 27 mounted on member 11. Both the tape and member 21' are calibrated from the intersection of their straight edges. In a modification, baseboard 4 is supported on a fixed base with frame 1 rotatable, and is crossed by flexible tapes extending at right-angles between housings slidable on bars carried at opposite sides of the frame. The tapes are fastened together, and may have a finger-piece, at the crossing point. In further modifications, (1) the housings for the crossing tapes are mounted on members guided by pinions engaging racks on the frame, which is trunnioned in side-brackets; (2) the crossing tapes are endless, and pass over drums slidable on bars at opposite sides of the frame, which is supported on four feet; (3) endless tapes are carried by members guided by rack-and-pinion mechanism. The tapes may also be guided by means such as pulleys and wires, or members sliding on felt pads.

German Patent Number DE3418260

Inventor: James Francis Cairns

Issued: Nov. 21, 1985

The invention relates to a drawing board, especially for the production of perspective drawings. Two rows of insertion apertures (8, 12, 16, 21, 24) are provided on the drawing board surface (2), laterally and at various heights, these apertures lying on a straight line and it being possible to insert into each of them a ruler (17, 18) with a pivot pin (19, 20) attached to the end. These insertion apertures form vertically selectable vanishing points.

U.S. Patent Number GB189902578

Inventor: George Mcmullen

Issued: Jul. 15, 1899

Slotted blades A, B are connected by links C, D pivoted at c<1>, d<1> to the blades and at c, d to slides a, b. The links are slotted for the reception of slides F, F<1> pivoted to each other at E. The slide F<1> can be traversed by. a screw G, and the slide F works loosely on a screw H and can be fixed in any required position by nuts H<1>, H<1>. I is a piece for fixing the instrument to the drawing-board, and I<1>, I<1> screws for adjusting the angle of the blade B. When the pivot E is central, as shown, the instrument is a parallel ruler, but with other adjustments of the slides F, F<1> it becomes an instrument which may be used approximately as a control line and, the scale on the link C showing the adjustments necessary for radii of given length.

While these measurement devices may be suitable for the purposes for which they were designed, they would not be as suitable for the purposes of the present invention, as hereinafter described.

SUMMARY OF THE PRESENT INVENTION

A primary object of the present invention is to provide a device for facilitating the correct measurement and placement of tiles having a clear planer structure and a slidably mounted rule that is releasably pivotal as a guide for producing even and squared tiling.

Another object of the present invention is to provide a device for facilitating the correct measurement and placement of tiles having a pivotal rule that has a plurality of indicia and a range of motion and settings relevant to common placement of tiles.

Yet another object of the present invention is to provide a device for facilitating the correct measurement and placement of tiles having a thin metal abutment edge that may be utilized with a bottom slide plate to be used as a guide for the precise placement of tile.

Still yet another object of the present invention is to provide a device for facilitating the correct measurement and placement of tiles having a wing nut utilized for the tightening or loosening of the rule to the top face plate for the setting or releasing of the rule at a set angle.

Another object of the present invention is to provide a device for facilitating the correct measurement and placement of tiles that has a transparent top plate for easy viewing of work material therethrough.

Yet another object of the present invention is to provide a device for facilitating the correct measurement and placement of tiles having a center channel for adjustment for spacing of the rule of the present invention and thin metal abutment plate.

Additional objects of the present invention will appear as the description proceeds.

The present invention overcomes the shortcomings of the prior art by providing a device for facilitating the correct measurement and placement of tiles having a transparent top plate for viewing the ruler therethrough. Also having a channel for the setting of a rule that is angularly and spatially adjustable from the thin metal abutment edge through the loosening and tightening of a wing nut and washer attached to the ruler through said channel. Additionally the rule of the present invention, also translucent, is equipped with a stop which end 1¼" from its side edges for the utilization of the present invention as a guide for correct placement of tile.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Tile Angle Measurement and Layout Tool of the present invention. With regard to the reference numerals used, the following numbering is used throughout the various drawing figures.

10 Tile Angle Measurement and Layout Tool of the present invention
12 transparent faceplate
14 center channel of 12
16 metal abutment edge of 12
18 transparent ruled slide plate
20 stop of 18
21 incremental markings
22 indicia of 18
24 grout consideration lines
26 fixed threaded member of 18
28 wing nut
30 washer
32 tile
34 workpiece

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
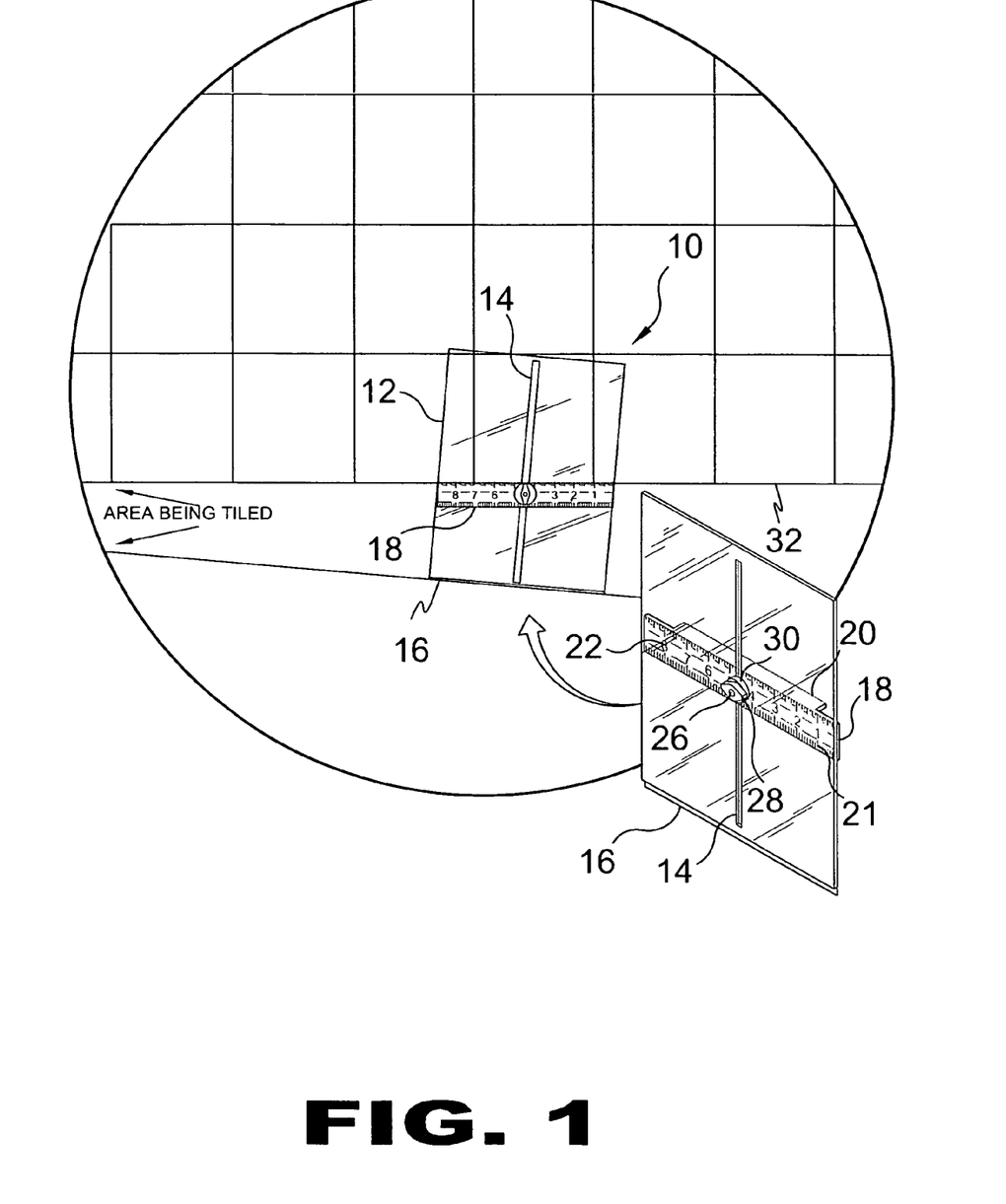
FIG. 1 is an illustrative view of the present invention.

FIG. 1 is an illustrative view of the present invention 10 in use. The present invention is an adjustable tile measurement and layout tool 10 designed to precisely measure and replicate an angled cut and form a template to transfer the angle to mark the tile 32 to be cut. The present invention 10 comprises a large transparent face plate 12 having a vertically-oriented centered channel 14 extending therethrough and a thin metal abutment edge 16 on the bottom edge thereof. A transparent ruled slide plate 18 is disposed behind the face plate 12 and is pivotally connected thereto with a washer 30 wing nut 28 screwed onto a threaded member 26 affixed to the slide plate 18 and extending through the channel 14 thereby enabling the slide plate 18 to travel along the channel 14 and rotate as needed. The slide plate 18 has a thin stop 20 extending perpendicularly from a portion of the top edge away from the faceplate 12. Shown is the stop 20 placed flush against the bottom of the horizontal tiles 32 and the face plate 12 tilted so the abutment edge 16 is flush against abutment and the incremental ruled markings 21 at the edges of the tile 32 above the stop 20 are noted by the respective indicia 22 for subsequently positioning the tile 32 to be cut. The wing nut 28 is tightened and the area between the noted ruled markings 21 between the stop 20 and the abutment edge 16 define the shape of the tile 32 to be cut and is used as a template for marking it when positioned accordingly.

Figure 2:
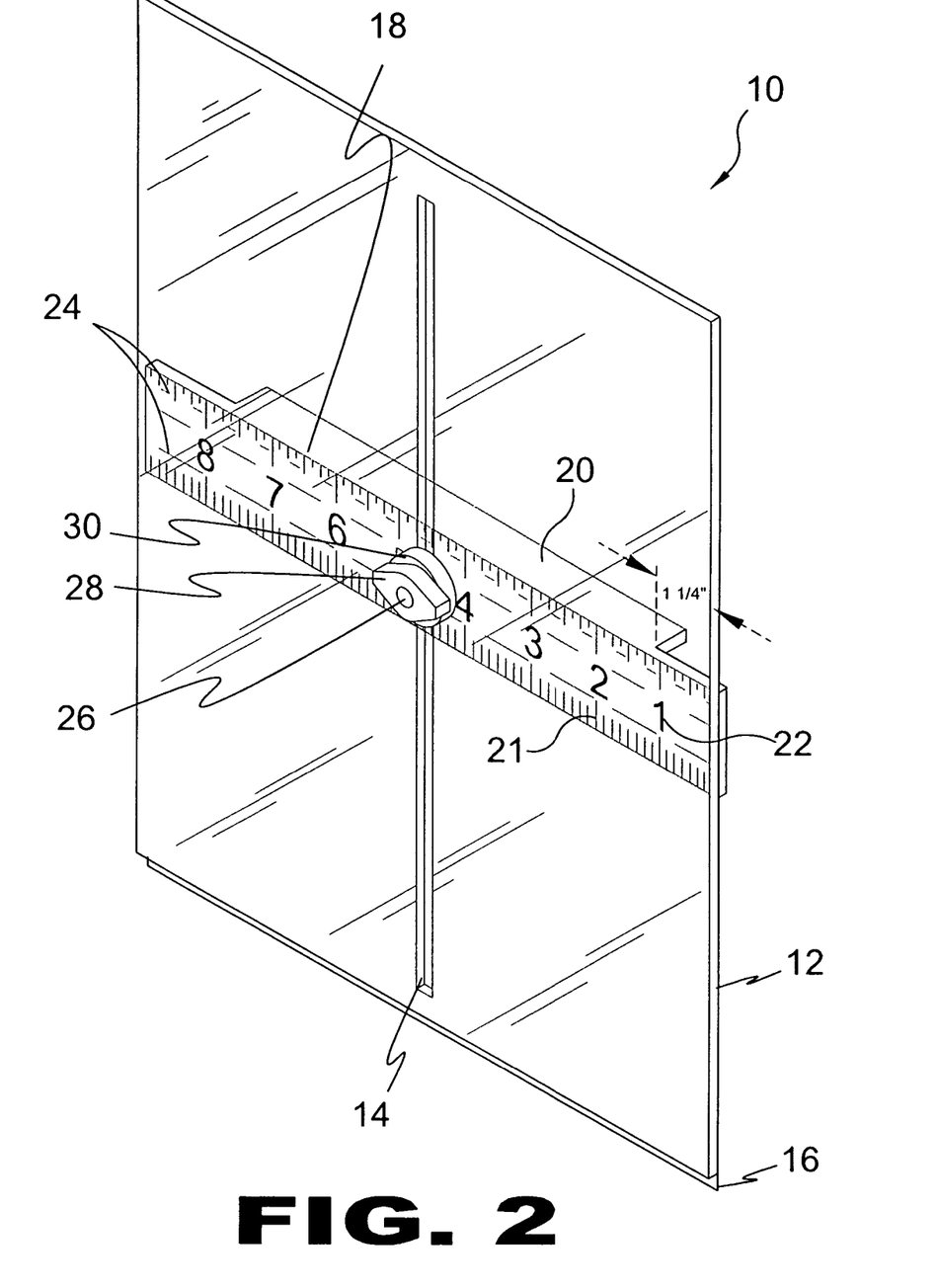
FIG. 2 is a perspective view of the present invention.

FIG. 2 is a perspective view of the present invention 10. The present invention is an adjustable tile measurement and layout tool 10 designed to precisely measure and replicate an angled cut and form a template to transfer the angle to mark a tile to be cut. The present invention 10 comprises a large transparent face plate 12 having a vertically-oriented centered channel 14 extending therethrough and a thin metal abutment edge 16 on the bottom edge thereof. A ruled slide plate 18 is disposed behind the face plate 12 and is pivotally connected thereto with a washer 30 wing nut 28 and screwed onto a threaded member 26 affixed to the slide plate 18 and extending through the channel 14 thereby enabling the slide plate 18 to travel along the channel 14 and rotate as needed. The slide plate 18 has a thin stop 20 extending perpendicularly from a portion of the top edge away from the faceplate 12. The edges of the slide plate 18 are aligned with the side edges of the face plate 12 when perpendicularly positioned with respect to the channel 14. The side edges of the stop 20 end 1¼" from the ends of the slide plate 18. Markings on the slide plate 18 further include a plurality of parallel grout consideration lines 24 extending longitudinally thereon.

Figure 3:
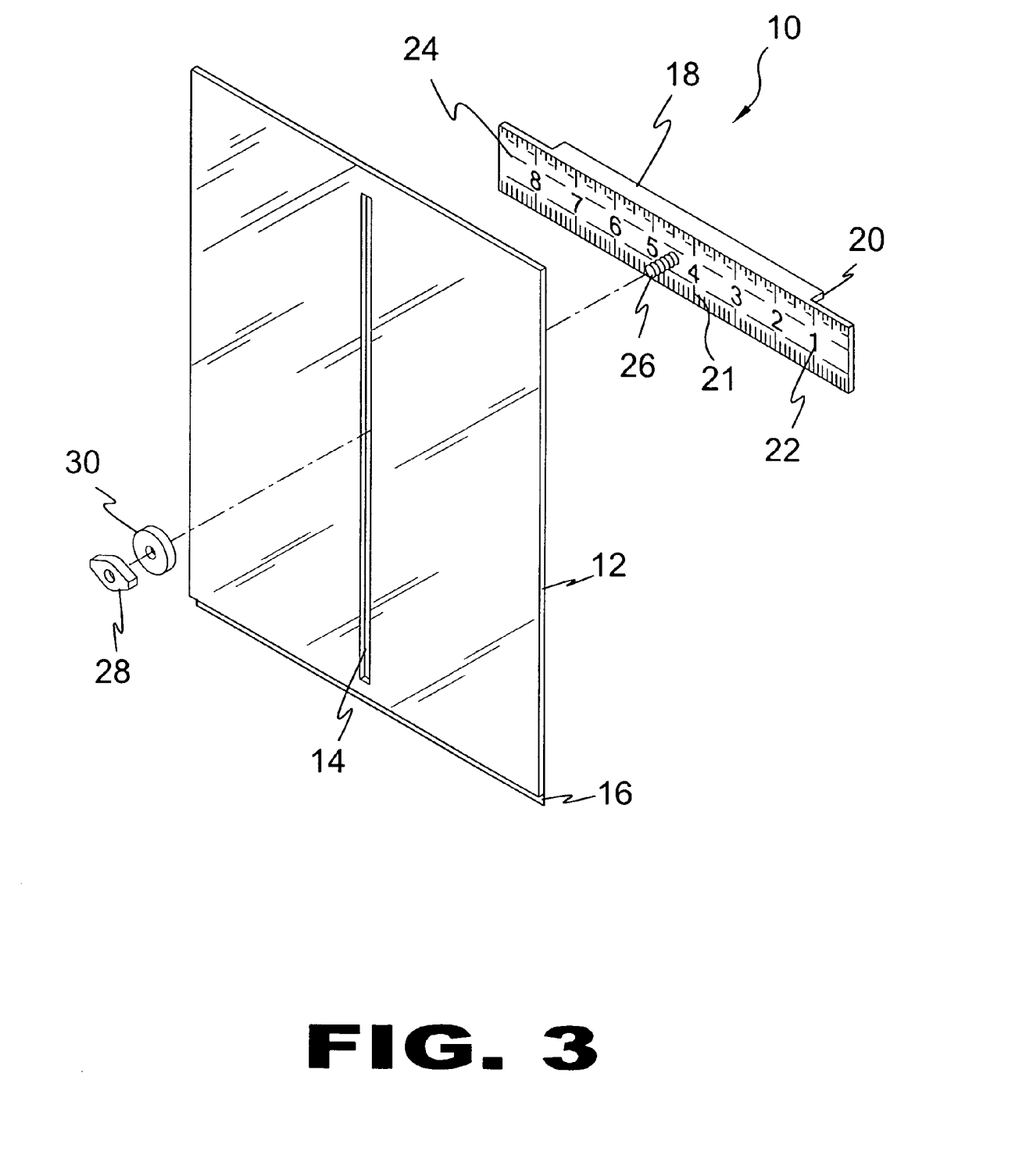
FIG. 3 is an exposed view of the components of the present invention.

FIG. 3 is an exploded view of the components of the present invention. 10. The present invention is an adjustable tile measurement and layout tool 10 designed to precisely measure and replicate an angled cut and form a template to transfer the angle to mark a tile to be cut. The present invention 10 comprises a large transparent face plate 12 having a vertically-oriented centered channel 14 extending therethrough and a thin metal abutment edge 16 on the bottom edge thereof. A ruled slide plate 18 is disposed behind the face plate 12 and is pivotally connected thereto with a washer 30 wing nut 28 and screwed onto a threaded member 26 affixed to the slide plate 18 and extending through the channel 14 thereby enabling the slide plate 18 to travel along the channel 14 and rotate as needed. The slide plate 18 has a thin stop 20 extending perpendicularly from a portion of the top edge away from the faceplate 12. The edges of the slide plate 18 are aligned with the side edges of the face plate 12 when perpendicularly positioned with respect to the channel 14. As noted by the incremental markings 21 and the respective indicia 22, the side edges of the stop 20 end 1¼" from the ends of the slide plate 18. Markings on the slide plate 18 further include a plurality of parallel grout consideration lines 24 extending longitudinally thereon.

Figure 4:
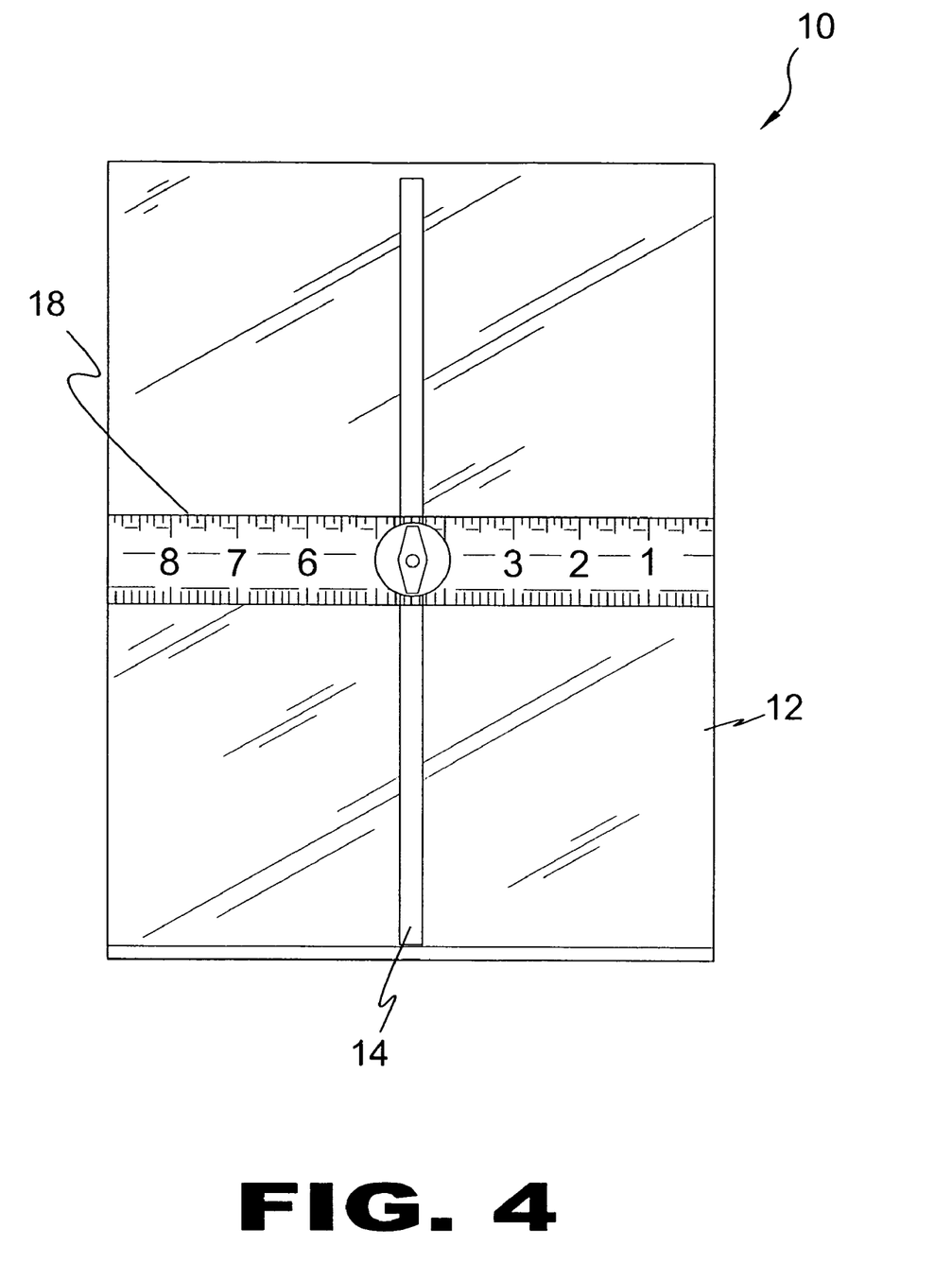
FIG. 4 is a top view of the present invention.

FIG. 4 is a front view of the present invention 10. Shown is the slide plate 18 centrally disposed in the channel 14 of the face plate 12 and in perpendicular relation therewith.

Figure 5:
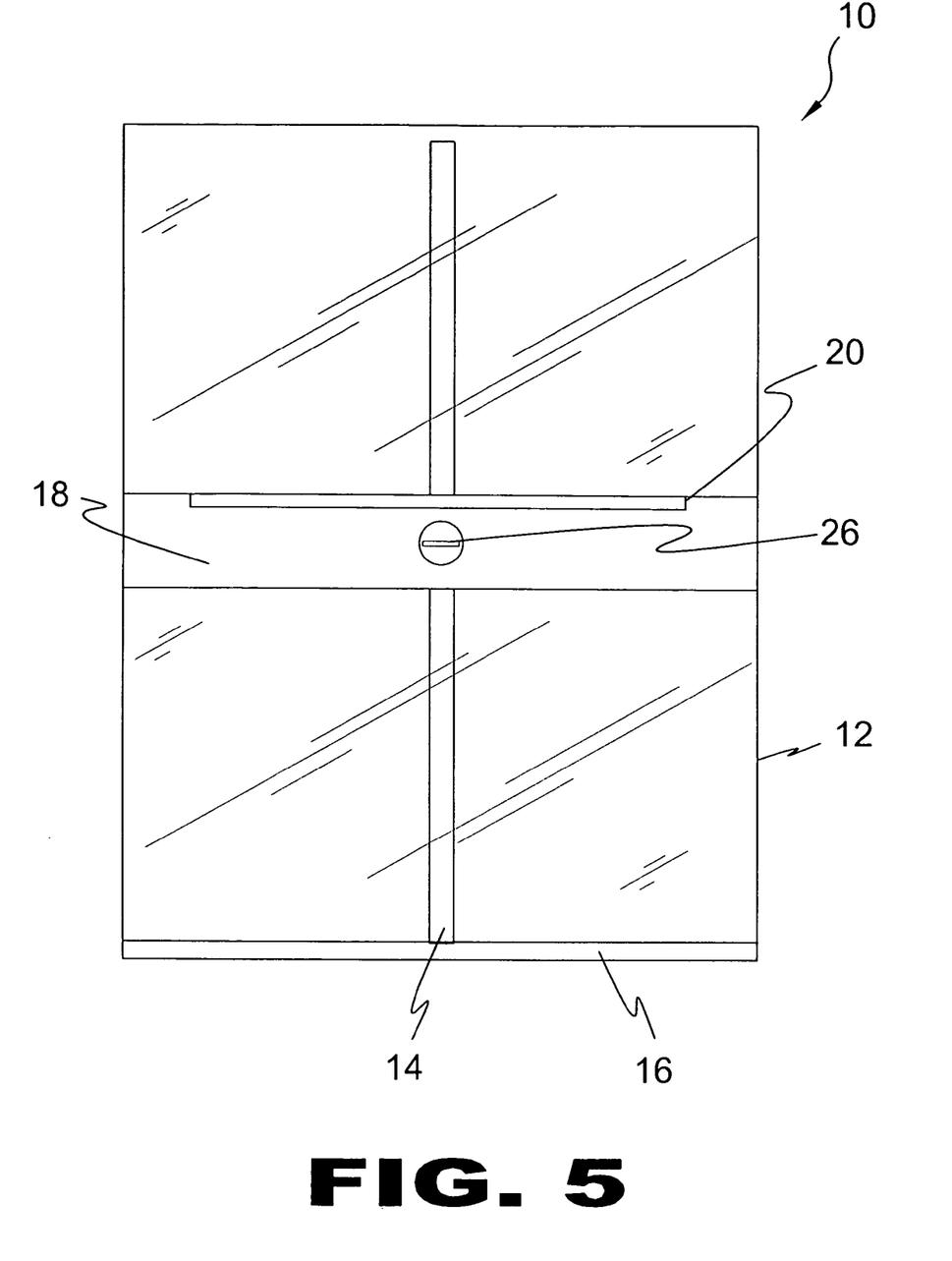
FIG. 5 is a rear view of the present invention.

FIG. 5 is a rear view of the present invention 10. Shown is the slide plate 18 centrally disposed in the channel 14 of the face plate 12 and in perpendicular relation therewith. Note that the stop 20 terminates 1¼" from each end of the slide plate 18. Also shown is the treaded member 26 and the metal abutment edge 16.

Figure 6:
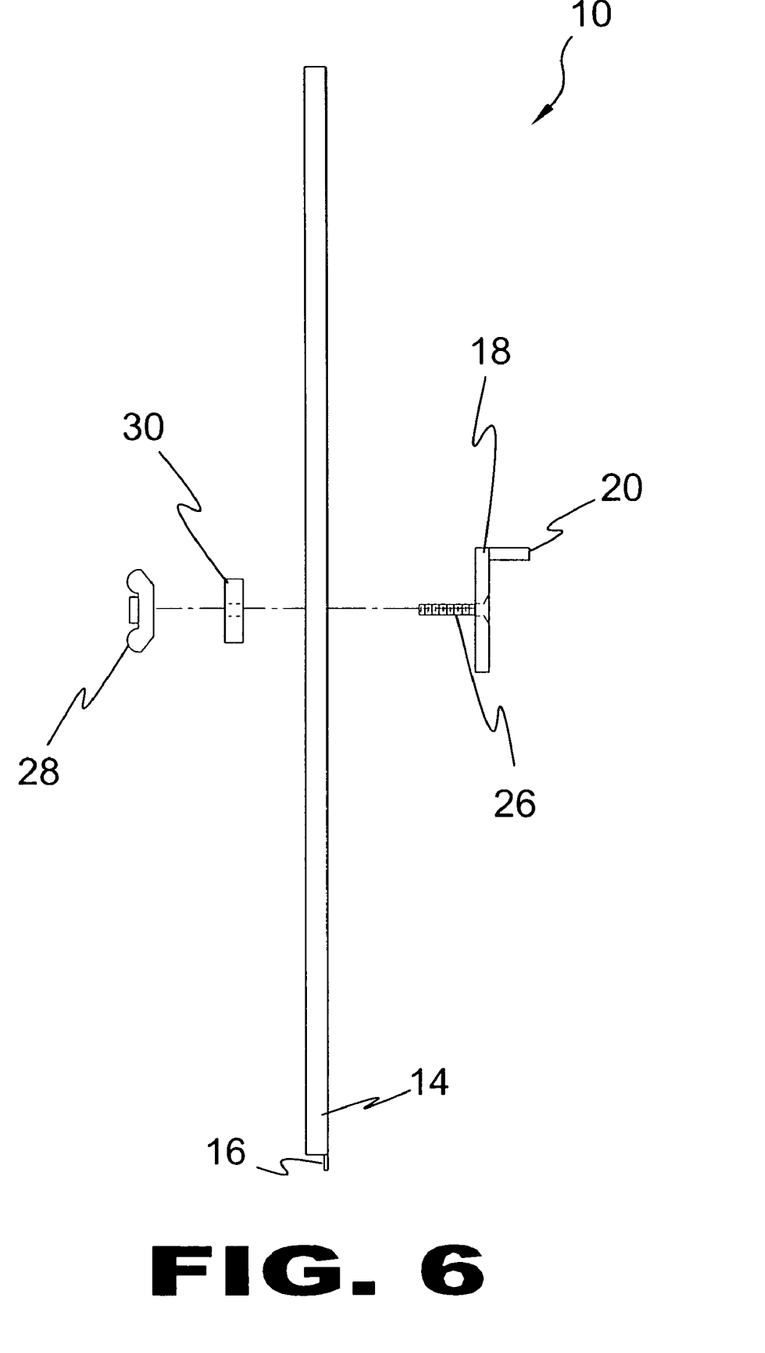
FIG. 6 is an exploded side view of the present invention.

FIG. 6 is an exploded side view of the present invention 10. Shown is a side view of the present invention 10, a device to establish for transfer a line to be placed on a work piece, consisting of two transparent plates of different size and appearance. A large transparent faceplate 12 with thin metal abutment edge 16. The smaller sliding plate 18 having a thin right angle stop 20 and fixed threaded member 26 to mate with the faceplate 12 and receive a washer 30 and wing nut 28 for the movement and securing of slide plate 18 once positioned. Note that the stop 20 terminates ¼" from each end of the slide plate 18.

Figure 7:
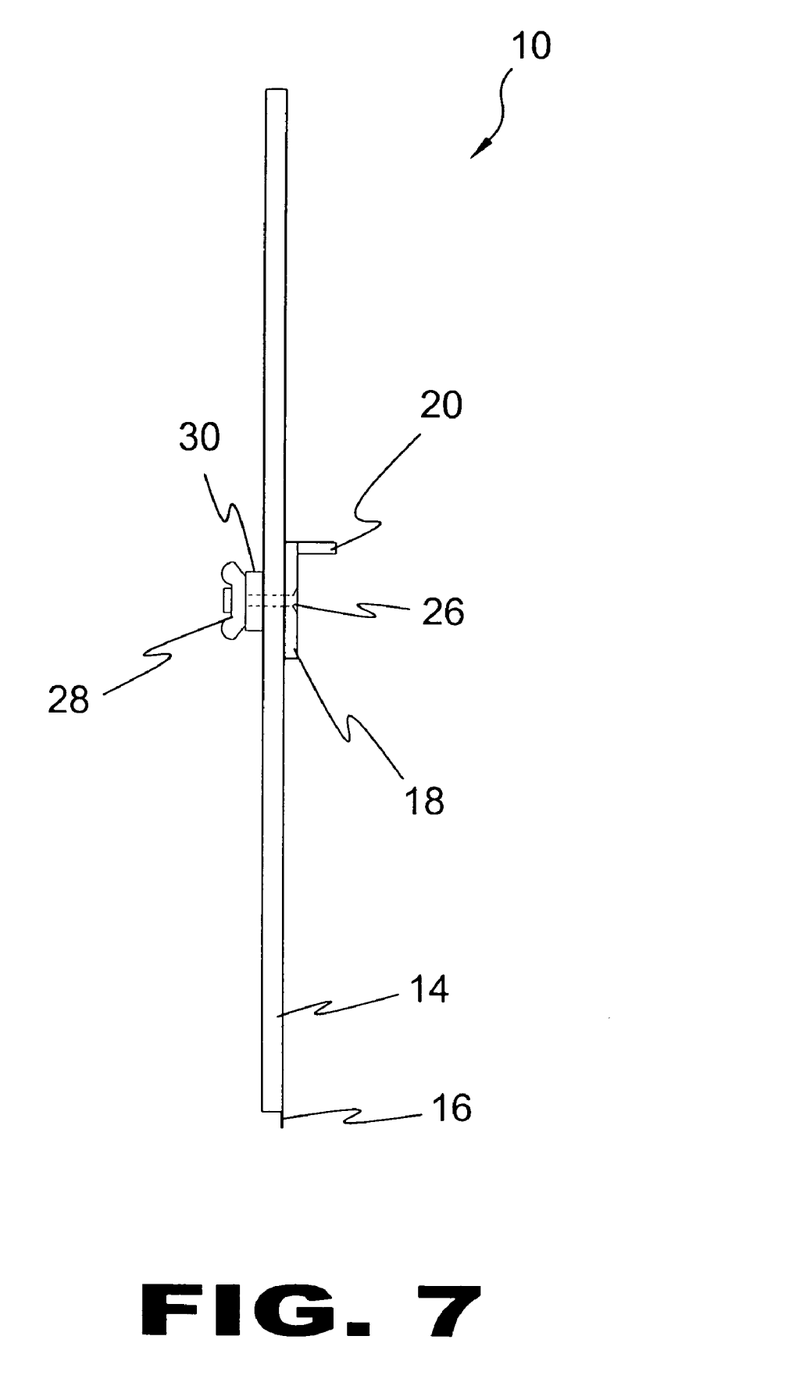
FIG. 7 is an assembled side view of the present invention.

FIG. 7 is an assembled side view of the present invention 10. Shown is a side view of the present invention 10, a device to establish for transfer a line to be placed on a work piece, consisting of two transparent plates of different size and appearance. A large transparent faceplate 12 with thin metal abutment edge 16. The smaller sliding plate 18 having a thin right angle stop 20 and fixed threaded member 26 to mate with the faceplate 12 and receive a washer 30 and wing nut 28 for the movement and securing of slide plate 18 once positioned. Note that the stop 20 terminates 1¼" from each end of the slide plate 18.

Figure 8:
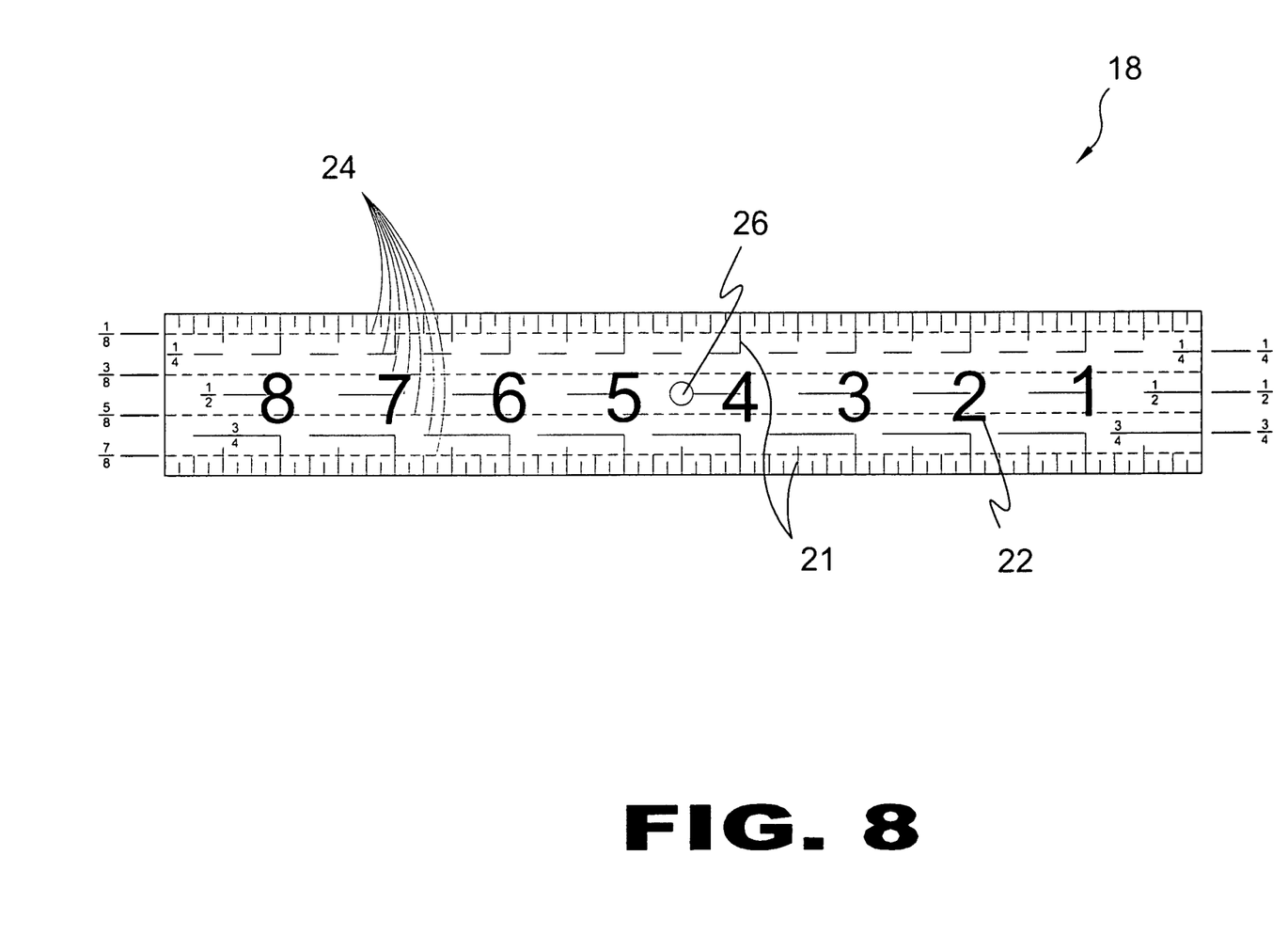
FIG. 8 is a front view of the measuring rule of the present invention.

FIG. 8 is a front view of the slide plate 18. Shown is the elongate transparent slide plate 18 with ruled incremental markings 21, indicia 22 and a plurality of parallel grout consideration lines 24 extending longitudinally thereon. A fixed threaded member 26 is disposed centrally thereon. The grout consideration lines 24 are broken or spaced to provide multiply reference points along the tiles edge. ¼, ½ and ¾ reflect said sizes smaller ⅛ inch marking also present.

Figure 9:
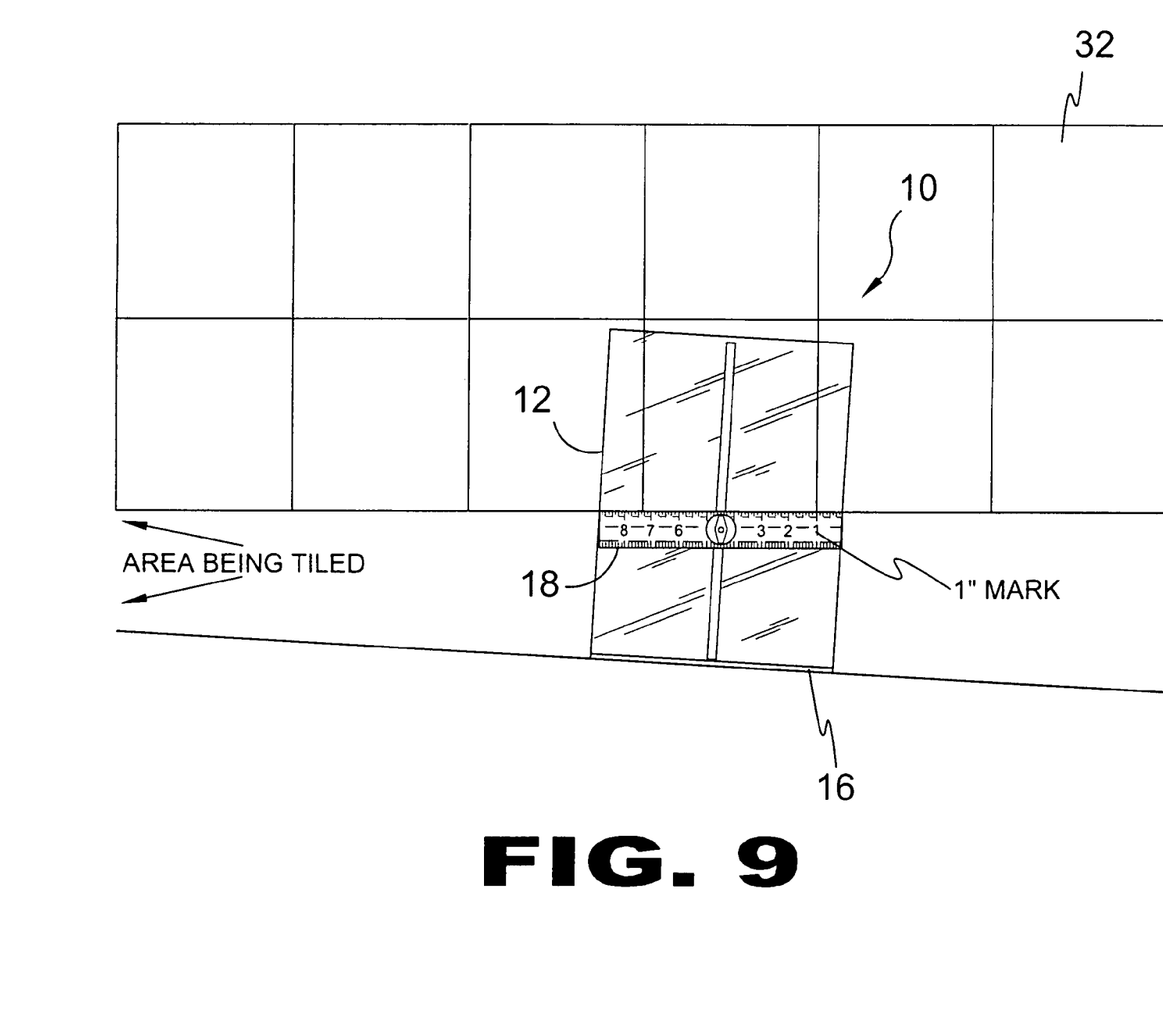
FIG. 9 is a frontal view of the present invention in use.

FIG. 9 is a frontal view of the present invention 10 in use. Shown is a frontal view of the present invention 10 in use, placed over area to be filled to establish a size needed for placement. Faceplate 12 side edge overlapping corner point of placed tile 32 slide plates 18 one inch mark becomes units side edge and allows faceplates 12 abutment edge 16 to provide for a full line to be drawn when moved to a work piece.

Figure 10:
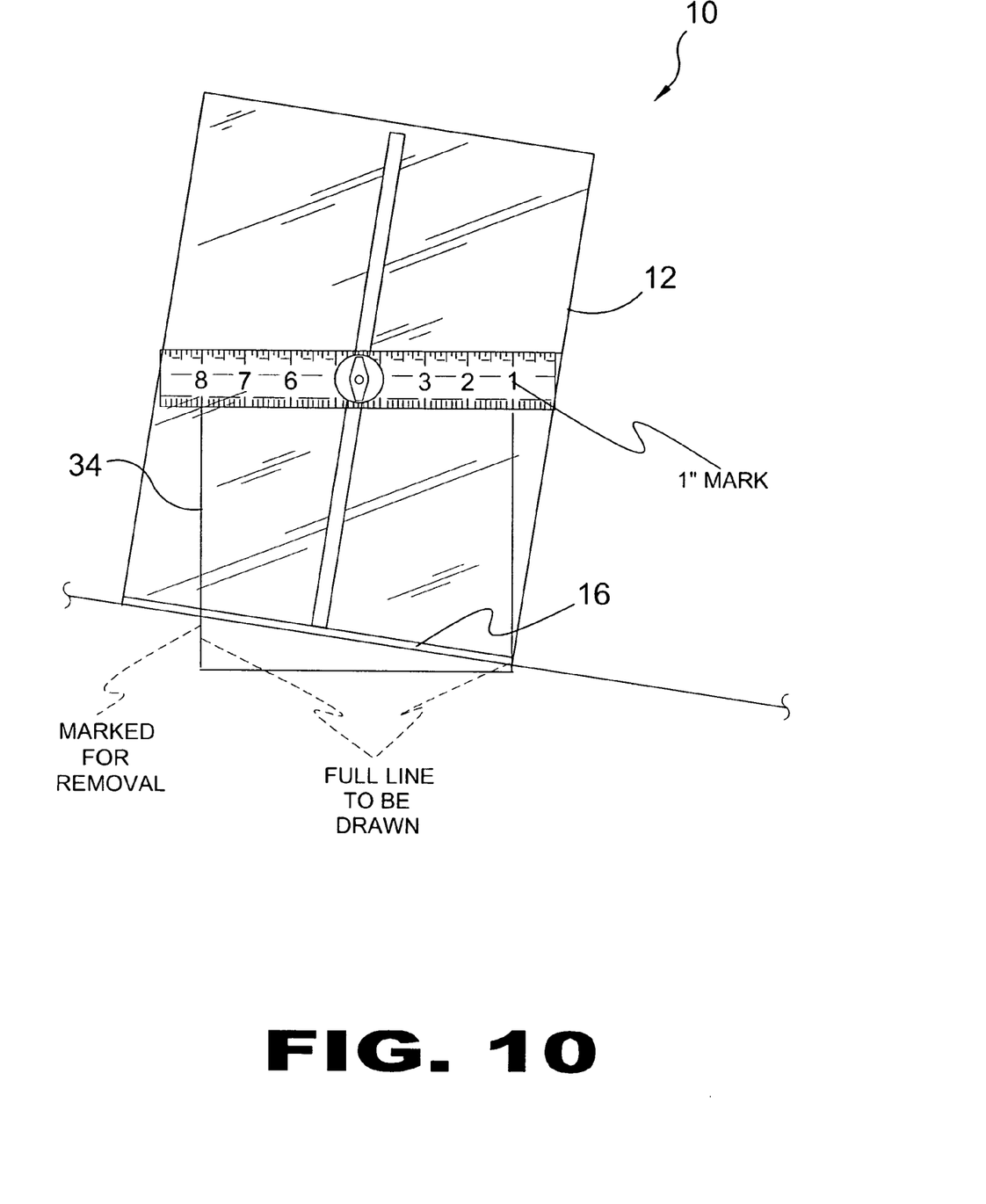
FIG. 10 is a frontal view of the present invention in use.

FIG. 10 is a frontal view of the present invention 10 in use. Shown is a frontal view of the present invention 10 in use, its position held and transferred to a work piece 34 for a line to be drawn one inch mark aligned with corner point of work piece 34 is transferred to a point on faceplates 12 abutment edge 16 for a full line or score to be placed.

Figure 11:
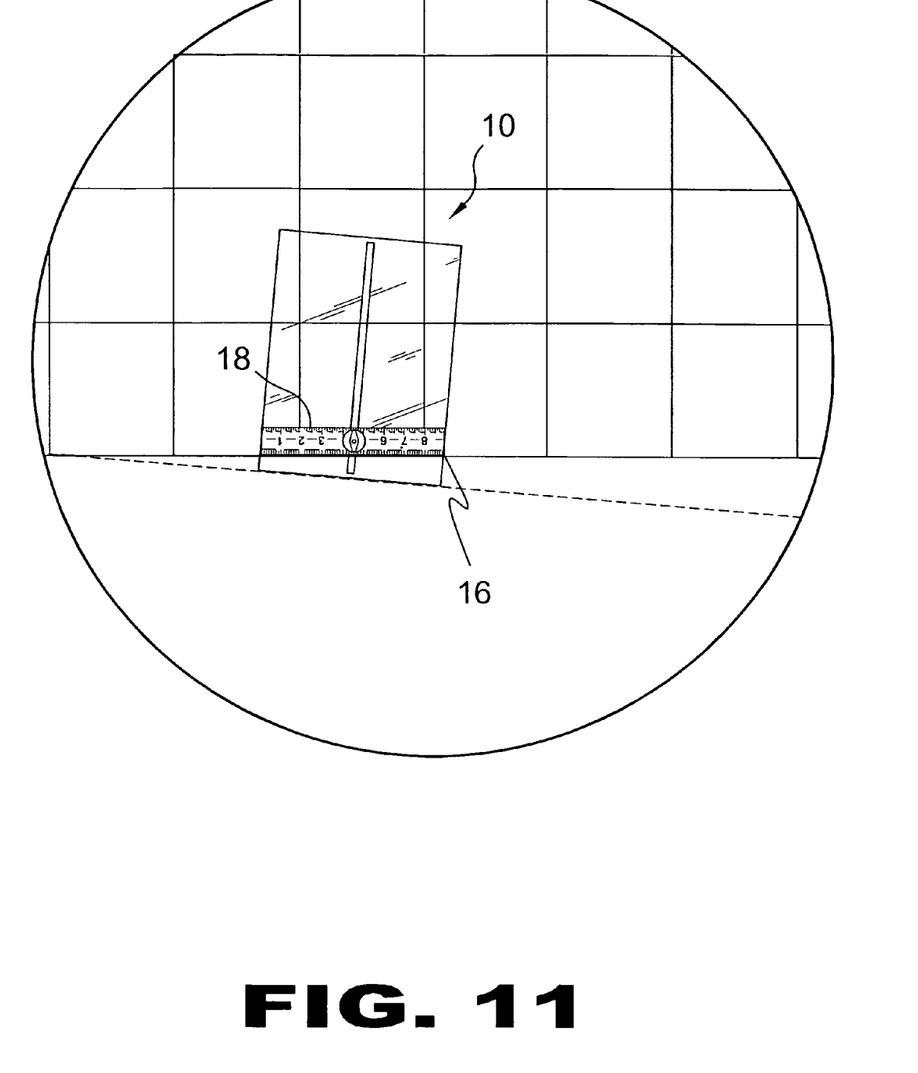
FIG. 11 is an illustrative view of the present invention.

FIG. 11 is an illustrative view of the present invention 10. Shown is the present invention 10 having the slide plate 18 rotated so its stop 20 is on the bottom to allow for the smallest of pieces to be made.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is new and desired to be protected by letters patent is set forth in the appended claims:

1. A tile angle measurement and layout tool to precisely measure an angled space and replicate an angled cut for a tile to fit into said angled space comprising:
    a) a transparent faceplate having a substantially parallelogram and a thin metal plate extending from tile rear portion of the bottom edge thereof to form an abutment edge;
    b) an elongated transparent ruled slide plate on an underside of said faceplate with a ruled face thereof facing said faceplate so that markings on said slide plate are visible through a front face of said faceplate, said slide plate including a stop projecting perpendicularly from a top edge thereof and extending away from said faceplate, said abutment edge and stop being located on oppositely facing sides of said faceplate and slide plate;
    c) a centrally disposed channel extending vertically through said faceplate; and
    d) a pivotal means for retaining said slide plate against said faceplate that enables said slide plate to slide up and down in said channel to a specific position and to rotate on said face plate to establish an angle for cutting said tile to fit into said angled space.

2. The tile angle measurement tool recited in claim 1, wherein said pivotal retaining means comprises:
    a) a threaded member centrally affixed to the ruled face of said slide plate and extending through said channel;
    b) a washer placed over said threaded member and against said faceplate on the opposing side thereof from said slide plate; and
    c) a wing nut threaded onto said threaded member which when loosened will enable said slide plate to freely pivot and travel along said channel and when tightened will prevent the displacement of said slide plate from the selected position.

3. The tile angle measurement tool recited in claim 2, wherein said stop terminates at approximately a distance of 1¼" from ends of said slide plate.

4. The tile angle measurement tool recited in claim 3, wherein said ruled face of said slide plate further includes a plurality of parallel grout consideration lines extending longitudinally thereon.

5. A tile angle measurement and layout tool to precisely measure an angled space and replicate an angled cut for a tile to fit into said angled space comprising:
    a) a transparent faceplate;
    b) a centrally disposed, straight channel extending through said faceplate;
    c) an elongated transparent ruled slide plate on an underside of said faceplate with a ruled face thereof facing said faceplate so that markings on said slide plate are visible through a front face of said faceplate;
    d) a pivotal means retaining said slide plate against said faceplate that enables said slide plate to slide along said channel to a specific position and to rotate on said face plate;
    e) said plate having a straight metal abutment edge extending from one side of the faceplate for engaging one side of said angled space; and
    f) said slide plate having a stop projecting perpendicularly away from said faceplate along an edge of said slide plate away from said abutment edge of said face plate for engaging an opposite side of said angled space whereby said abutment edge and said stop of said slide plate establish a cutting line for said tile to fit into said angled space.

6. A method for precisely measuring an angled space for cutting a tile to fit into said angled space comprising the steps of:
    a) placing a transparent faceplate over said angled space with a straight metal abutment edge extending from one side of the faceplate engaging one side of said angled space, said faceplate having a centrally disposed, straight channel extending through said faceplate;
    b) sliding an elongated transparent ruled slide plate on an underside of said faceplate along said channel and rotating said slide plate until a stop thereof projecting perpendicularly away from said faceplate along an edge of said slide plate away from said abutment edge of said faceplate engages an opposite side of said angled space, using grout consideration lines on said slide to allow for placement of grout, said plate having a ruled face facing said faceplate so that markings on said slide plate are visible through a front face of said faceplate;
    c) reading markings on said slide plate to locate side edges of said tile to be cut; and d) placing said faceplate over said tile with said stop engaging one edge of said tile and moving said faceplate until said faceplate is lined up with markings obtained from said angled space whereby said abutment edge of said faceplate establishes a cutting line on said tile for fitting said tile into said angled space.

* * * * *